Patented Dec. 16, 1947

2,432,499

UNITED STATES PATENT OFFICE 2,432,499

ACETYLATION OF β-KETONIC COMPOUNDS

Albert B. Boese, Jr., Charleston, W. Va., assignor to Carbide and Carbon Chemicals Corporation, a corporation of West Virginia No Drawing. Application May 15, 1943, Serial No. 487,127

18 Claims. (Cl. 260—483)

This invention relates to the production of acylated derivatives of organic compounds containing at least one active methylene group or a labile hydrogen atom. More especially it concerns the production of acyl derivatives of β-ketonic compounds, such as β-diketones, β-ketonic carboxylic acid esters and β-ketonic acid amides, by reacting such β-ketonic compounds with ketene in the presence of a reaction promoter of the type hereinafter described. The invention has especial utility in connection with the acetylation with ketene of compounds of the type corresponding to the formula

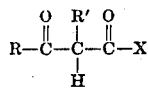

wherein R represents an alkyl group, R' represents the same or a different alkyl group or hydrogen, and X represents a group selected from the class consisting of the alkyl groups, the oxyalkyl groups, and the NHR³ groups wherein R³ is an organic radical or hydrogen.

Heretofore attempts to acetylate β-ketonic compounds having active methylene groups, such as the acetoacetic esters, by reacting the latter, at their boiling points, with ketene, either in the absence of a catalyst or in the presence of catalytic quantities of such acetylation catalysts as sulfuric acid and benzene sulfonic acid, have resulted in very little acetylation while, because of the high temperatures required, a large quantity of the ketene is lost by polymerization, resulting in low efficiencies.

The present invention is based in important part upon the discovery that certain metals and derivatives thereof have remarkable catalytic activity for the acetylation of active methylene groups in the aforesaid β-ketonic compounds, thereby making it possible to conduct the acetylation of compounds containing an active methylene group or a labile hydrogen atom at low temperatures and with high efficiencies.

The active reaction promoters or catalysts useful with the invention include the metals of groups I and II of the periodic system, and derivatives of such metals formed by reacting a β-ketonic compound with such a metal, or with a compound of such a metal capable of replacing one or more hydrogen atoms of an active methylene group of a β-ketonic compound.

Highly effective reaction promoters may be produced by heating the appropriate acetoacetic acid ester or other β-ketonic compound with one of the periodic system, preferably until evolution of hydrogen ceases and, if desired, in the presence of inert diluents such as benzene, toluene, or naptha.

As is well known, the metals of group I of the periodic system include each of the alkali metals; and the metals of group II of the periodic system include each of the alkaline earth metals. Each of the alkali metals and the alkaline earth metals lies above hydrogen in the electromotive series.

The reaction promoter may conveniently be admixed with the β-ketonic compound prior to contacting the ketene therewith, or it may be formed in situ in the mixture of reactants by mixing with the β-ketonic compound, or solution thereof in a volatile solvent inert to the reactants, prior to or concurrently with the introduction of the ketene, a metal selected from groups I and II of the periodic system, or a compound of such a metal capable of replacing one or more hydrogen atoms of an active methylene group of the β-ketonic compound to form a metal derivative of the latter.

Among the suitable reaction promoters may be mentioned the sodium, potassium, copper, lithium, magnesium, calcium, zinc and barium derivatives of acetoacetic methyl, ethyl, propyl and butyl esters; the corresponding metal derivatives of β-diketones, such as the sodium derivative of acetylacetone, CH₃.C.(ONa):CH.CO.CH₃.; and corresponding metal derivatives of β-ketonic amides and substituted amides, such as the sodium derivative of acetoacetic amide, and the magnesium derivative of acetoacetanilide. Most of the aforesaid metals lie above hydrogen in the electromotive series. As previously indicated, the reaction promoters also include the metals of groups I and II of the periodic system, and compounds thereof, such as the alcoholates, phenolates, acetates, oxides, etc., which are reactive with one or more hydrogen atoms of the reactive methylene group of the β-ketonic compound to form the corresponding metal derivatives.

According to a preferred form of the invention, ketene is contacted with a β-ketonic compound, preferably by passing the ketene into or through a solution or suspension in such ketonic compound of the reaction promoter or catalyst. The acetylation may conveniently be conducted while maintaining the reaction mixture at a temperature within the range between about −40° C. and 150° C. At temperatures above 100° C., however, the tendency of the ketene to polymerize results in lower efficiencies. Most satisfactory results are obtained at temperatures ranging between 0° and In cases where the β-ketonic compound to be acetylated is a liquid at the temperature employed for the reaction, the ketene may be diffused directly through the undiluted liquid. In cases where the ketonic compound is a solid, the latter may be dissolved in solvents which are inert toward the reactants, such as the dialkyl ethers, aliphatic and aromatic hydrocarbons and chlorinated hydrocarbons, for example, diethyl ether, isopropyl ether, benzene, toluene, carbon tetrachloride, ethylene dichloride and chloroform.

Under the conditions of the acetylation reaction, when conducted in the presence of the catalyst-forming metal or compound thereof, the said metal or compound reacts with the β-ketonic compound to form a metal derivative thereof. The latter appears to be the principal reaction promoter.

When metallic oxides or other metal compounds, such as magnesium oxide, calcium acetate, etc., are employed for the production of the active reaction promoter or catalyst, the oxide or other compound and the β-diketonic compound containing the active methylene group desirably are first heated to form the metal derivative of the ketonic compound, before the ketene treatment is begun. This reaction advantageously may be conducted at temperatures from around 80° C. to around 100° C.

The following examples will illustrate certain modifications of the invention:

Example I

One gram of magnesium was suspended in 206 grams of methyl acetoacetate. Thereafter ketene was passed through this suspension while maintaining the latter at 60° C., until 60 grams of ketene had been absorbed. After filtering off unchanged magnesium, the filtrate was fractionated under an absolute pressure of 11 mm. of mercury, yielding, in addition to 30 grams of unreacted methyl acetoacetate, 169 grams of methyl diacetylacetate, boiling at 87°–89° C. under that pressure. This corresponds to a yield of 73%, based on the ketene employed.

Runs were conducted under similar conditions using calcium and zinc, respectively, as the reaction promoter. These runs provided yields of 74% and 75%, respectively, of the methyl diacetylacetate.

Example II

One-tenth of a gram of sodium was dissolved in 200 grams of methyl acetoacetate. The liquid was then cooled to a temperature of 20° C., and ketene was passed through the liquid until 72 grams of ketene had been reacted. The resultant reaction mixture was fractionally distilled under an absolute pressure of 10 mm. of mercury, thereby yielding, in addition to some unchanged methyl acetoacetate, 200 grams of methyl diacetylacetate, corresponding to an efficiency of over 86%, based upon methyl acetoacetate.

Example III

A suspension of 0.1 gram of calcium oxide in 193 grams of methyl acetoacetate was heated to 80° C. for 5 minutes. It was then cooled to a temperature of around 20° C., at which temperature ketene was passed through the liquid until 69 grams of the ketene had been absorbed. Fractional distillation of the reaction mixture under subatmospheric pressure yielded methyl diacetylacetate in a yield of 69%, based upon the ketene employed.

Under similar conditions, but wherein magnesium oxide was substituted for the calcium oxide, an 89% yield of methyl diacetylacetate was obtained.

Example IV

Ketene was passed through a suspension of 1 gram of magnesium in 271 grams of ethyl acetoacetate maintained at 55° C. until 82 grams of ketene had been absorbed. Fractional distillation of the reaction mixture under vacuum provided an 82% yield of ethyl diacetylacetate in the form of a colorless liquid which distilled at from 96 to 99° C. under an absolute pressure of 11 mm. of mercury.

Example V

Ketene was passed through a suspension of 0.1 gram of magnesium in 250 cc. of acetylacetone, maintained at 20° C., until 107 grams of ketene had reacted. Upon fractional distillation of the reaction mixture there were obtained 296 grams of triacetylmethane, a liquid which distilled at 100° C. under an absolute pressure of 19 mm. of mercury. The yield of the latter based on the acetylacetone was 83%.

Example VI

A solution of 200 grams of acetoacetanilide in 500 cc. of xylene containing 0.1 gram of calcium was heated to 90° C. for 5 minutes, and then cooled to 60° C. Ketene was then passed through the solution while maintained at this latter temperature until 48 grams of ketene were absorbed. Upon cooling the solution to 0° C., 178 grams of diacetylacetanilide separated as a colorless crystalline solid compound which melted at 123° C. By concentrating the filtrate to 200 cc., an additional 26 grams of the compound were secured, providing a total yield of 82% based upon the acetoacetanilide.

It will be understood that other β-ketonic compounds containing at least one active methylene group or a labile hydrogen atom, besides those specifically mentioned herein, may advantageously be acetylated in accordance with the invention. Representative β-ketonic compounds which may thus be acetylated include β-ketonic carboxylic acid esters, such as the methyl, ethyl, propyl, butyl and higher esters of acetoacetic acid (β-ketobutyric acid), methylacetoacetic acid (CH₃COCH(CH₃)COOH)

ethylacetoacetic acid, propylacetoacetic acid, propionylacetic acid, butyrylacetic acid, and butyrylbutyric acid (C₃H₇COCH(C₂H₅)COOH); β-diketones such as acetylacetone, the alkylacetylacetones, benzoylacetone, acetylpropionylmethane (CH₃COCH₂COC₂H₅), and acetylbutyrylmethane, (CH₃COCH₂COC₃H₇); and β-ketonic carboxylic acid amides such as acetoacetamide, methylacetoacetamide (CH₃COCH(CH₃)CONH₂), acetoacetanilide, p-ethoxy acetoacetanilide, and o-methyl acetoacetanilide.

The acetylated compounds produced by the practice of the invention have utility for many purposes. Particularly, they are useful as starting materials in the production of various acylated chemical compounds such as acetylacetone.

It will be evident from the foregoing that, by the practice of the invention, high yields of valuable acylated derivatives of β-ketonic compounds are produced by a comparatively simple and readily-controlled reaction occurring between highly reactive compounds, under conditions minimizing polymerization of ketene and other reaction losses, and permitting recovery in simple manner of the desired product in relatively pure form.

The term "β-diketones" is used in the specification and claims to designate 1:3 diketones, such as acetylacetone. They are commonly designated as acyl ketones. See pages 401–403 of volume I of "Richter's Organic Chemistry," third edition, Allott, Nordemann Publishing Company, Inc., New York.

These diketones have the two keto carbon atoms in the 1:3 position relative to each other.

The invention is susceptible of modification within the scope of the appended claims.

I claim:

1. Process for acetylating a β-ketonic compound containing at least one labile methylene hydrogen atom, which comprises reacting ketene with such compound, in the presence of a metal derivative of a β-ketonic compound having at least one active methylene hydrogen atom, the metal of which is selected from the class consisting of those metals of groups I and II of the periodic system lying above hydrogen in the electromotive series, and recovering from the resultant reaction mixture the acetylated β-ketonic compound thus produced.

2. Process as defined in claim 1, wherein the β-ketonic compound is an ester of a β-ketonic carboxylic acid.

3. Process for acetylating a β-ketonic compound having directly connected to the keto carbon atom an active methylene group having at least one labile hydrogen atom, which comprises reacting such a compound with ketene in the presence of a metal derivative of a β-ketonic compound having at least one active methylene hydrogen atom, the metal of said derivative being selected from the group consisting of the metals of groups I and II of the periodic system lying above hydrogen in the electromotive series.

4. Process for acetylating a β-ketonic compound containing at least one labile methylene hydrogen atom, which comprises reacting such a compound with ketene in the presence of a product of the reaction of a β-ketonic compound with a compound of a metal selected from the class consisting of the metals of groups I and II of the periodic system, lying above hydrogen in the electromotive series.

5. Process for acetylating a β-ketonic compound containing at least one labile methylene hydrogen atom, which comprises reacting ketene with said β-ketonic compound in the presence of a metal compound formed by reacting a β-ketonic compound having at least one active methylene hydrogen atom with a compound of a metal selected from the group consisting of the metals of groups I and II of the periodic system lying above hydrogen in the electromotive series, and recovering from the resultant reaction mixture the acetylated β-ketonic compound thus produced.

6. Process for acetylating a β-ketonic compound of the type corresponding to the formula

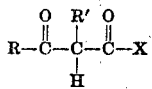

wherein R represents an alkyl group, R' represents a radical selected from the class consisting of hydrogen and the alkyl groups, and X represents a group selected from the class consisting of the alkyl groups, the oxyalkyl groups and the NHR³ groups wherein R³ is selected from the class consisting of hydrogen, the phenyl group, and the alkyl-substituted and alkoxy-substituted phenyl groups, which comprises reacting such a β-ketonic compound with ketene in the presence of a metal derivative of a β-ketonic compound having at least one labile methylene hydrogen atom, wherein the metal is selected from the class consisting of the metals of groups I and II of the periodic system lying above hydrogen in the electromotive series, and recovering from the resultant reaction mixture the acetylated β-ketonic compound thus produced.

7. Process for acetylating a β-ketonic compound of the type corresponding to the formula

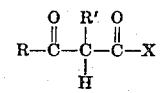

wherein R represents an alkyl group, R' represents a radical selected from the class consisting of hydrogen and the alkyl groups, and X represents a group selected from the class consisting of the alkyl groups, the oxyalkyl groups, and the NHR³ groups wherein R³ is selected from the class consisting of hydrogen, the phenyl group, and the alkyl-substituted and alkoxy-substituted phenyl groups, which comprises reacting ketene with such a β-ketonic compound, while the latter has admixed therewith the magnesium derivative of such a β-ketonic compound.

8. Process for acetylating a β-ketonic compound of the type corresponding to the formula

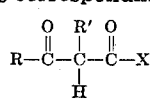

wherein R represents an alkyl group, R' represents a radical selected from the class consisting of hydrogen and the alkyl groups, and X represents a group selected from the class consisting of the alkyl groups, the oxyalkyl groups and the NHR³ groups wherein R³ is selected from the class consisting of hydrogen, the phenyl group, and the alkyl-substituted and alkoxy-substituted phenyl groups, which comprises reacting ketene with such a β-ketonic compound, while the latter has admixed therewith the sodium derivative of such a β-ketonic compound.

9. Process for acetylating a β-ketonic compound of the type corresponding to the formula

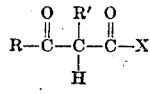

wherein R represents an alkyl group, R' represents a radical selected from the class consisting of hydrogen and the alkyl groups, and X represents a group selected from the class consisting of the alkyl groups, the oxyalkyl groups and the NHR³ groups wherein R³ is selected from the class consisting of hydrogen, the phenyl group, and the alkyl-substituted and alkoxy-substituted phenyl groups, which comprises reacting ketene with such a β-ketonic compound while the latter has admixed therewith the calcium derivative of such a β-ketonic compound.

10. Process for producing an ester of diacetylacetic acid, which comprises reacting ketene with an acetoacetic ester in the presence of a metal derivative of such acetoacetic ester, which metal is selected from the class consisting of the metals of groups I and II of the periodic system lying above hydrogen in the electromotive series, and separately recovering from the resultant reaction mixture the diacetylacetic acid ester present therein.

11. Process for producing an ester of diacetylacetic acid, which comprises reacting an acetoacetic ester and an oxide of a metal selected from the class consisting of the metals of groups I and II of the periodic system lying above hydrogen in the electromotive series, thereafter contacting the reaction mixture with ketene at a temperature within the range between −40° C. and 150° C., and separately recovering from the resultant reaction mixture the diacetylacetic acid ester present therein.

12. Process for acetylating a β-ketonic compound having directly connected to the keto carbon atom an active methylene group having at least one labile hydrogen atom, which comprises reacting ketene with such a β-ketonic compound having uniformly distributed therein a metal selected from the class consisting of the metals of groups I and II of the periodic system lying above hydrogen in the electromotive series, and recovering from the resultant reaction mixture the acetylated β-ketonic compound thus produced.

13. Process for acetylating a β-ketonic compound having directly connected to the keto carbon atom an active methylene group having at least one labile hydrogen atom, which comprises reacting ketene with said β-ketonic compound while the latter is maintained at a temperature within the range between 0° and 100° C., and while it contains uniformly distributed therein a metal selected from the class consisting of the metals of groups I and II of the periodic system lying above hydrogen in the electromotive series, and recovering from the resultant reaction mixture the acetylated β-ketonic compound thus produced.

14. Process for producing an ester of diacetylacetic acid, which comprises reacting ketene with the corresponding ester of acetoacetic acid, while the latter has admixed therewith a metal selected from the group consisting of the metals of groups I and II of the periodic system lying above hydrogen in the electromotive series, separating unreacted metal from the reaction mixture, and thereafter recovering from the latter the diacetylacetic acid ester present therein.

15. Process for acetylating an acylated acetone, which comprises reacting the latter with ketene in the presence of a metal selected from the class consisting of the metals of groups I and II of the periodic system lying above hydrogen in the electromotive series, and recovering from the resultant reaction mixture the acetylated derivative of the acylated acetone thus produced.

16. Process for producing a diacylacetamide, which comprises reacting a β-ketonic carboxylic acid amide having at least one active methylene hydrogen atom with ketene in the presence of a metal selected from the class consisting of the metals of groups I and II of the periodic system lying above hydrogen in the electromotive series and forming metal derivatives with β-ketonic compounds, and recovering from the resultant reaction mixture the diacylacetamide thus produced.

17. Process for producing a diacetylacetamide, which comprises reacting an acetoacetamide with ketene in the presence of a metal selected from the class consisting of the metals of groups I and II of the periodic system lying above hydrogen in the electromotive series, and recovering from the resultant reaction mixture the diacetylacetamide thus produced.

18. Process for producing diacetylacetanilide, which comprises reacting acetoacetanilide with a metal selected from the class consisting of the metals of groups I and II of the periodic system lying above hydrogen in the electromotive series, in the presence of an inert diluent for the reactants, thereafter admixing ketene with the reaction mixture while maintaining the latter at a temperature within the range between around 0° and around 100° C., and separately recovering from the resultant reaction mixture the diacetylacetanilide thus produced.

ALBERT B. BOESE, Jr.

REFERENCES CITED

The following references are of record in the file of this patent:

UNITED STATES PATENTS

| Number | Name | Date |
|---|---|---|
| 2,279,020 | Cohen | Apr. 7, 1942 |
| 2,018,759 | Frolich et al. | Oct. 29, 1935 |
| 1,982,675 | Law | Dec. 4, 1934 |
| 2,417,381 | Spence | Mar. 11, 1947 |

FOREIGN PATENTS

| Number | Country | Date |
|---|---|---|
| 453,577 | Germany | Dec. 10, 1927 |

OTHER REFERENCES

Gwynn et al., J. A. C. S. (64), 1942, pp. 2216–2218.